United States Patent [19]

Greist, III et al.

[11] Patent Number: 5,499,739
[45] Date of Patent: Mar. 19, 1996

[54] THERMOPLASTIC LINER FOR AND METHOD OF OVERWRAPPING HIGH PRESSURE VESSELS

[75] Inventors: Darton Greist, III, Clifton; Irving E. Figge, Sr., Manassas, both of Va.

[73] Assignee: Atlantic Research Corporation, Gainesville, Va.

[21] Appl. No.: 183,452

[22] Filed: Jan. 19, 1994

[51] Int. Cl.$^6$ ........................................................ B65D 1/16
[52] U.S. Cl. ............................. 220/589; 220/414; 138/30
[58] Field of Search ....................................... 220/414, 589; 138/30, 109

[56] References Cited

U.S. PATENT DOCUMENTS

| | | |
|---|---|---|
| 2,995,011 | 8/1961 | Kimmel . |
| 3,368,708 | 2/1968 | Pflederer . |
| 3,446,385 | 5/1969 | Ponemon . |
| 3,655,085 | 4/1972 | Aleck . |
| 3,750,823 | 8/1973 | Carter et al. . |
| 3,765,557 | 10/1973 | Giwer . |
| 3,945,578 | 3/1976 | Kaminsky . |
| 3,969,812 | 7/1976 | Beck . |
| 3,977,614 | 8/1976 | Hardwick . |
| 3,994,431 | 11/1976 | Steiner . |
| 4,005,233 | 1/1977 | Dritt et al. . |
| 4,053,081 | 10/1977 | Minke . |
| 4,714,094 | 12/1987 | Tovagliaro . |
| 4,778,073 | 10/1988 | Ehs . |
| 4,905,856 | 3/1990 | Krogager . |
| 5,025,943 | 6/1991 | Forsman . |
| 5,091,478 | 2/1992 | Saltman . |

OTHER PUBLICATIONS

Andy Wood, "Rilsan B Gas Pipe in Australia—AGL's Goldline Experience", The American Gas Association Materials Conference, Feb. 3, 1992.
"Zytel® FN Flexible Nylon Alloy", Products and Properties Guide, Oct. 1990, pp. 1–3. Sep. 1990.

Primary Examiner—Joseph M. Moy
Attorney, Agent, or Firm—Lowe, Price, LeBlanc & Becker

[57] ABSTRACT

A pressure vessel liner for fuel tanks used to store high pressure gasses including methane or compressed natural gas includes thermoplastic materials exhibiting low permeability and mechanical properties resistant to thermal and pressurization strains over the operating cycle of the fuel tanks. The pressure vessel liner is made from a material selected from the group consisting of modified nylon 6 or nylon 11. The present invention also discloses a method of forming a reinforced composite fuel tank wherein the pressure vessel liner is overwrapped with both low-angle helical and high-angle helical filament windings. The high-angle helical windings are overwrapped around the liner across at least the cylinder-to-dome transition region at angles between 60° and 88° with respect to the longitudinal axis of the liner. High angle helical filament windings at these angles eliminate excessive composite windings typically added to account for weak transition points in these regions. The high-angle helical windings can be effectively wound without slippage, thereby providing a simplified overwrapping process and improved reinforced liner construction.

8 Claims, 2 Drawing Sheets

THERMOPLASTIC LINER FOR AND METHOD OF OVERWRAPPING HIGH PRESSURE VESSELS

FIELD OF THE INVENTION

The present invention is directed to a thermoplastic liner for high pressure vessels and a method of overwrapping such vessels, and in particular, thermoplastic materials having low permeability to pressurized gases and adequate ductility at −40° F. as the liner material and a method of overwrapping filaments in a predetermined pattern around the thermoplastic liner for improved mechanical properties and processing.

BACKGROUND ART

In the prior art, various types of materials have been proposed for use as liners in high pressure vessel or tank construction. Liner materials include metallic liners such as steel disclosed in U.S. Pat. No. 4,714,094. Alternatively, non-metallic liners such as polyethylene or polypropylene have been utilized as well as polyamides such as nylon 6, disclosed in U.S. Pat. No. 5,025,943.

However, metallic liners for pressure vessels are disadvantageous given their excessive weight. In applications where the pressure vessels function as fuel containers, the excessive weight results in lower fuel economies.

The above-mentioned thermoplastic-type liners also have drawbacks when used in high pressure vessels in connection with fuel storage. Typically, pressure vessels containing compressed natural gas (CNG) are subject to extremely high pressures, for example, 2,400 to 3,600 psi and large service temperature extremes, typically −40° F. to +140° F. Although non-metallic liner construction can offer the advantage of lighter weight and higher gas volumes than other types of tanks, some non-metallic liners suffer from a relatively high permeation rate of the gaseous contents of the pressure vessel. Since these types of thermoplastic resins are porous on a microscopic basis, they are subject to gaseous diffusion through the thermoplastic material, the diffusion resulting in gas loss from the high pressure vessel and a potential safety hazard. To reduce this permeation rate to an accepted level, the thickness of these liners must be increased resulting in reduced tank volume. Other of these prior art thermoplastic materials have low permeation but when subject to the high pressure and large temperature extremes required in fuel tank service, they fail in a brittle manner at the low end of the service temperature extreme (−40° F).

Given the brittleness and unacceptable levels of permeability for the prior art thermoplastic liners, a need has developed to provide a thermoplastic liner having low permeability and sufficient flexibility or elongation to withstand the temperature extremes typically found in highly pressurized gas vessels.

In response to this need, the present invention overcomes the deficiencies in prior art materials by providing a thermoplastic liner made of a modified nylon 6 or nylon 11 material as a pressure vessel liner.

Nylon 11 marketed as Rilsan® B and manufactured by ELF ATOCHEM a division of Elf Aquitane of France, is known for use in natural gas pipelines given its superior mechanical and chemical properties over other plastic materials. Nylon 11 has been found to be resistant to stress cracking and degradation in soil environments. However, there is no recognition in the prior art concerning nylon 11 in the application as a high pressure vessel liner for gaseous fuel storage such as CNG with the associated mechanical and permeation requirements for this particular service application.

Modified nylon 6 marketed as Zytel® and manufactured by Dupont in the U.S.A. is also known and disclosed in U.S. Pat. No. 5,091,478, hereby incorporated in its entirety by reference. It is intended that the term "modified Nylon 6" encompass to all formulations encompassed by this patent for application according to the invention. This thermoplastic composition is disclosed for use in a wide range of molding, coating and adhesive applications including various automotive applications, wire and cable coating and high temperature adhesive applications. Again, the prior art does not teach the use of this thermoplastic composition in highly pressurized fuel tank gas liners as a liner material or its low permeability and sufficient mechanical properties for this particular service application.

In the prior art, it is also known to overwrap liners for pressure vessels with filaments in various configurations to improve vessel load resistance. In U.S. Pat. No. 3,969,812, a method of manufacturing an overwrapped pressure vessel is disclosed. The construction of this overwrapped pressure vessel is illustrated in FIG. 1 wherein the pressure vessel is designated by the reference numeral 1. Included in the overwrapped filaments are cylindrical or hoop windings 3 and helical or polar windings 5, 7 and 11. As disclosed in this patent, the cylindrical windings extend into the dome portion as shown by reference numeral 9. A final cylindrical layer 15 is provided which terminates at each of the dome transition points 17. The helical or polar windings are formed in overlapping relationship to form a laminate structure of the filaments around the outer surface of the liner 19.

U.S. Pat. No. 5,025,943 to Forsman also discloses a pressure vessel having a filamentary wound structure. In this patent, cylindrical or hoop windings are combined with helical or polar windings. In this pressure vessel, the cylindrical or hoop windings terminate at the cylinder-to-dome transition point.

U.S. Pat. No. 3,368,708 to Pflederer also discloses a filament wound tank design wherein the filaments are wound at helix angles in the range of 24° to 19½° for optimal stress resistance. This patent does not disclose overwrapping the cylinder-to-dome transition.

U.S. Pat. No. 2,995,011 to Kimmel discloses a solid propellant rocket motor utilizing a fiberglass roving impregnated with an epoxy resin wound in a reverse spiral pattern over the propellant charge assembly. This single layer winding serves as a combustion or burning restricting material.

U.S. Pat. No. 4,714,094 to Tovagliaro also discloses an overwrapped gas-oil pressure accumulator. In this patent, low angle helical windings are used along the cylindrical portion of the accumulator due to the relatively large port diameter. The angle of the windings is approximately 55° with respect to the longitudinal axis of the accumulator. The helical windings extend in the transition zone between the cap and the lining dependent upon the angle of the filaments therein.

However, these prior art designs are disadvantageous in failing to adequately strengthen the cylinder-to-dome transition area. In U.S. Pat. No. 3,969,812, the termination of the cylindrical windings is shown by reference numeral 17 in FIG. 1. To overcome these problems, prior art designs use excessive windings which add extra cost and weight to the pressure vessel. However, when the cylindrical windings 9 at essentially 90° to the longitudinal axis of the pressure vessel cover the cylinder-to-dome transition area as shown in FIG. 1, the windings slip off the dome. This slippage makes it difficult if not impossible to overwrap and maintain these windings in a tight and adjacent fashion during pressure vessel manufacture. Invariably, the filaments slip down the cylinder-to-dome transition, thereby delaying the winding process or compromising pressure vessel integrity or rendering the vessel useless. To prevent this slippage, dams or other restraining devices are used on the exterior surface of the liner to prevent this slippage. However, these dams also add extra cost in manufacturing and produce a stress riser due to an abrupt change in section modulus which can diminish performance.

Moreover, limited slippage of the cylindrical windings 9 of FIG. 1 results in gap formation between adjacent windings. When helical windings overlap the spaced apart cylindrical windings, a void is formed in the overwrapped structure which provides a low strength area in the overall pressure vessel construction.

Thus, a need has developed to overcome the drawbacks of these types of overwrapping methods and liner construction. In order to overcome the deficiencies noted above in the prior art, the present invention provides a novel method of winding filaments in the helical and hoop directions. In particular, high angle helical windings are wound along the cylinder and through the cylinder-to-dome transition point at high angles, up to 88° from the longitudinal axis of the pressure vessel. These high-angle helical windings eliminate the slippage of the cylindrical windings described above and also eliminate void occurrence and reduced strength properties in this transition area.

SUMMARY OF THE INVENTION

It is a first object of the present invention to provide an improved liner material for high pressure vessels, particularly for CNG pressure vessels.

Another object of the present invention is to provide a vessel liner material made of either a modified nylon 6 or nylon 11 exhibiting low permeability and adequate elongation at both low and high temperatures.

Another object of the present invention is to provide a method of overwrapping a pressure vessel liner to strengthen the cylinder-to-dome transition area and provide an improved filament overwrapped liner construction.

Other objects and advantages of the present invention will become apparent as a description thereof proceeds.

In satisfaction of the foregoing objects and advantages, the present invention provides an improvement in a high pressure vessel liner typically made of thermoplastic material, wherein the liner forms a chamber with at least one opening therein for storing highly pressurized gas. The improvement comprises selecting a thermoplastic material for the pressure vessel liner from the group consisting of a modified nylon 6 and nylon 11. The high pressure vessel liner made from these materials exhibits low permeability to pressurized gases such as hydrocarbons and high ductility and elongation over an operating temperature range of about −40° F. to 140° F.

The present invention also discloses an improved method of overwrapping a pressure vessel liner with a filament material. The high pressure vessel liner comprises a cylindrical portion arranged between an end portion and a dome portion or dome portions. The cylindrical portion is separated from the dome portion by a cylinder-to-dome transition region. During overwrapping the pressure vessel liner with filaments in both a helical and hoop orientation, in its broadest embodiment, the present invention comprises overwrapping a portion of the filaments around the high pressure vessel liner at least in the cylinder-to-dome transition region in a high angle helical orientation where an angle between each of the filaments of the overwrapped portion of filaments and longitudinal or polar axis of the high pressure vessel liner is between 60° and less than 88°. This high angulation for the helical orientation filaments maintains the filaments in place in the cylinder-to-dome transition region without slippage when being overlapped. More preferably, the angle is between 70° and 88° and most preferably 80° and 88°. This improves pressure vessel strength and integrity.

BRIEF DESCRIPTION OF THE DRAWINGS

Reference is now made to the drawings accompanying the invention wherein.

DESCRIPTION OF THE PREFERRED EMBODIMENTS

The present invention provides a new and improved liner for composite fuel tanks designed to store highly pressurized gases such as methane or compressed natural gas. The inventive pressure vessel liner uses either nylon 11 or a modified nylon 6 as the liner material. This liner material can withstand the thermal and pressurization strains at an operating temperature of −40° F. while simultaneously having a high resistance to gas permeation and economic viability.

Manufacturing the high pressure vessel liners with nylon 11 or a modified nylon 6 also permits a weight savings over prior art liner construction. This weight savings is realized by the ability to form thinner wall sections while still retaining adequate resistance to permeability of the highly pressurized gases contained in the pressure vessel liners. These materials as pressure vessel liners also provide improvements in gas storage volume again due to the thinner wall thickness. They effectively contain the gas over an operating temperature range of −40° F. to 140° F. while exhibiting high elongation at the lower end of the operating range.

Figure 1:
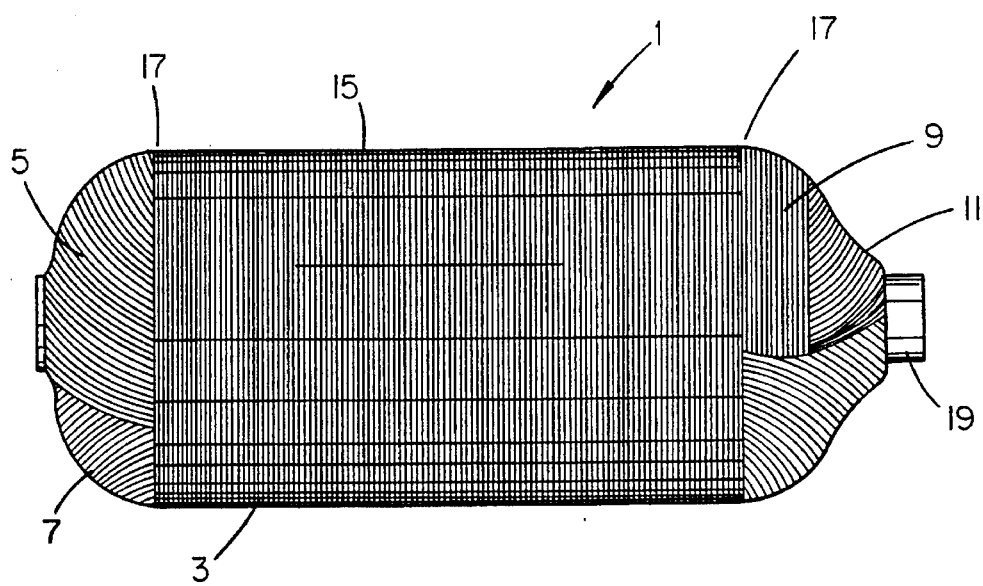
FIG. 1 is a schematic representation of a prior art pressure vessel depicting helical or polar overwraps in combination with hoop or cylindrical overwraps.
Figure 2:
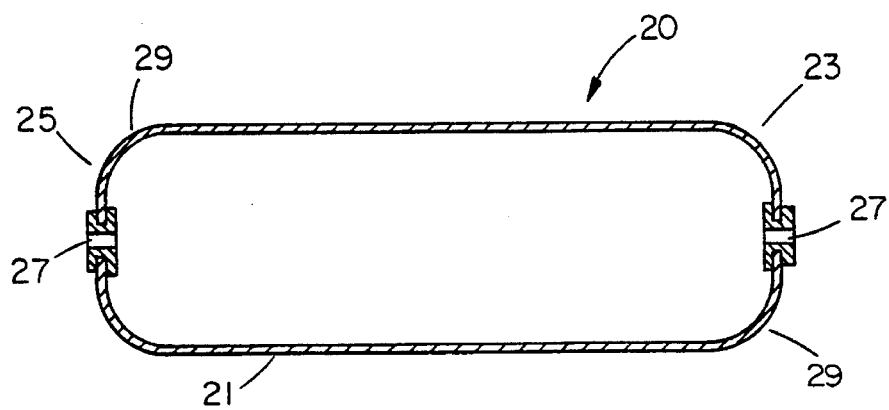
FIG. 2 is sectional view of a high pressure vessel liner made from materials according to the invention.

With reference now to FIG. 2, a cross-sectional area of a pressure vessel liner designated by the reference numeral 20 is depicted. The pressure vessel liner 20 includes a cylindrical portion 21 arranged between opposing liner dome portions 23 and 25. Each of the dome portions can also include an opening 27 therein.

Arranged between the cylindrical portion 21 and the opposing dome portion 23 and 25 are cylinder-to-dome transition regions 29. Each of these regions include a tangent point of the cylinder 21 which is defined as the intersection of the straight cylinder section and the dome. The criticality of the tangent point in connection with the overwrapping aspect of the present invention will be discussed hereinafter.

It should be understood that the nylon 11 and modified nylon 6 family are known materials. As described above, the modified nylon 6 family of material is disclosed in U.S. Pat. No. 5,091,478 and marketed under the tradename Zytel® flexible nylon alloys by Dupont. Any of the family of materials disclosed in this patent are believed to be adaptable for use in accordance with the invention. Likewise, nylon 11 is manufactured and marketed world-wide by ATOCHEM of France and characterized by the tradename Rilsan® B. As will be described hereinafter, these materials provide unexpected improvements in pressure vessel liner construction and properties when subjected to the operating conditions typically found in highly pressurized gas vessel applications.

As described above, by using either the modified nylon 6 or nylon 11 with their low permeability to gas diffusion, a significant decrease in wall thickness for liners can be achieved which results in an increased tank capacity over prior art materials given the same liner exterior dimensions.

Based on the American Gas Association specification; a liner must be of sufficient thickness such that the vessel will meet the permeability limit of 0.25 cc/hr/liter. Assuming a baseline vessel volume of 91 liters, the maximum permeation allowed is a flow of 23 cc/hr. Using room temperature conditions, a polyethylene liner would increase the tank weight by 10 pounds and decrease the volume 5% over a modified nylon 6 or nylon 11 liner. This demonstration of weight increase and volume decrease using polyethylene is based upon the following relationships:

$$P = \frac{q \times d}{A \times t \times \Delta P}$$

where P=permeability (cc mil/atm day 100 in$^2$), d=liner thickness (mils), A=liner area (in$^2$), $\Delta P$=driving pressure (atm), q/t=flow (cc/hr). Using the values discussed above, and permeability values of 0.83 for Nylon 11, 3.29 for modified nylon 6 and 27.0 for polyethylene, a liner thickness to meet the AGA specification based upon modified nylon 6 is 28 mils at ambient conditions. In contrast, a polyethylene liner thickness would be 228 mils (ambient conditions). Using a safety factor of over 3 for the nylons and a less conservative value for polyethylene gives a minimum wall thickness of 0.1" for nylon 11 and modified nylon 6 and 0.25" for polyethylene. Then using the weight and volume relationships below, the above mentioned weight and volume comparisons are made. Liner weight relationship (ignoring domes):

$$\frac{W_1}{W_2} = \frac{p_1(R_1^2 - r_1^2)}{p_2(R_2^2 - r_2^2)}$$

liner volume relationship (ignoring domes):

$$\frac{V_1}{V_2} = \frac{r_1^2}{r_2^2}$$

where W is liner weight (lbm), p is liner material density (lbm/in$_3$), R is the liner major diameter (in), r is the liner minor diameter (in), (R–r is liner thickness) and V is internal liner volume. Therefore, a liner material which has a methane permeation coefficient below 6(cc mil/atm day 100 in$^2$) is preferred.

Figure 4:
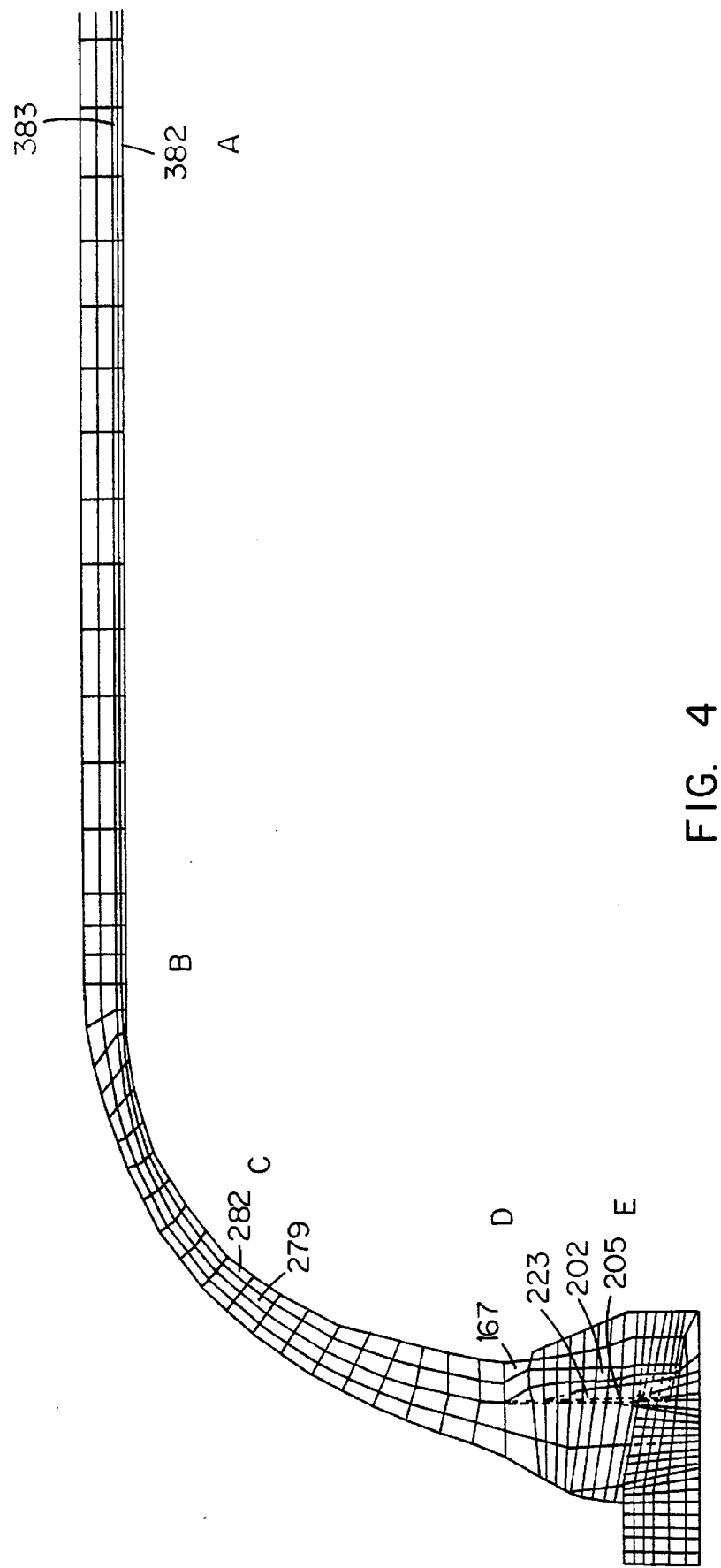
FIG. 4 is a finite element model of the dome region of a high pressure vessel described herein including elements representing the liner, filament winding, and polar boss.

The theoretical operating strain was determined from a finite element model referring now to FIG. 4. A finite element axi-symmetric TEXLESP model was created for the dome region of the vessel; it included the composite case, liner and pole piece. Internal pressure loading and thermal effect were analyzed separately and then superimposed. With the service pressure of 3600 psi and boundary conditions imposed, a maximum liner strain of 0.856% was found in element 282 near point C. Then, a temperature drop of 290° F. was imposed. This represents the temperature delta from the liner stress free state during cure at 250° F. to the lower expected operating temperature of –40° F. The model predicts a maximum principal strain of 2.12% in element 282 again near point C. Superimposing the predictions, the maximum principal strain in the liner is 2.98% on the first cycle. The maximum strains are additive because the occur in the same element and they have nearly the same principal angle. Assuming a 25% degradation to biaxiality, the strain becomes 3.97% in a uniaxial strain field such as a tensile specimen. Since the part is being cycled, the yield strain of the liner material should be higher than the strain induced during each cycle. Assuming a factor of two, the liner material should have a tensile yield and ultimate strain of 7.94% or higher at –40° F.

During the course of the invention it was unknown which particular liner material possessed this characteristic and if they would in fact work in the full scale vessel. Extensive subscale mechanical property and permeation testing was conducted to screen material candidates versus the desired values of greater than 7.94% ultimate and yield strain at –40° F. and less than a 6.0 (cc mil/atm day 100 in$^2$) methane permeation coefficient. After down selecting to the two best candidates presented here, actual full scale liners were made and pressure cyclic testing was done at –40° F. with the completed pressure vessels to determine if the materials have the required properties. It was observed that materials which exhibit ultimate strain values below 7.94% fail when used as the tank liner during service pressure cycling at –40° F.

Referring now to Table 1, the measured properties of a nylon 11 and modified nylon 6 are shown. In this table, while the yield strain, of both materials are less than the desired minimum of 7.94% and their ability to survive –40° F. pressure cycling was not assured, the rupture or ultimate strain values are above the minimum required value of 7.94%. Table 1 represents tensile testing results at –40° F. and a two inch per minute testing speed. Thus, as mentioned above, the inventive liner materials were subjected to subsequent full scale pressure vessel cycling and this has proven that both materials can effectively withstand thermal and pressurization strains at –40° F. and materials with ultimate strains of less than 7.94% at –40° F. cannot withstand the thermal and pressurized strains at –40° F.

TABLE 1

| SAMPLE | –40° F. SUBSCALE PROPERTIES | | | |
|---|---|---|---|---|
| | YIELD STRESS (Psi) | YIELD STRAIN (%) | RUPTURE STRESS (Psi) | RUPTURE STRAIN (%) |
| Nylon 11 | 6950 | 3.3 | 7320 | 14.2 |
| Modified Nylon 6 | 4500 | 3.5 | 7000 | 78.3 |

The inventive high pressure liner also provides unexpected improvements in permeability. Table 2 compares the permeability of different polymers to methane. As evident from this table, the nylon 11 and modified nylon 6 polymers exhibit much lower permeability than either the high density polyethylene, thermoplastic polyester elastomer (TPE), or melt processable rubber (MPR). These low permeabilities of the nylon 11 and modified nylon 6 are especially critical when the inventive pressure vessel liners are used in compressed natural gas applications for vehicle use.

TABLE 2

METHANE PERMEATION COEFFICIENT AT 20° C.
(cc. mil/Atm day 100 in$^2$)

| MATERIAL | PERMEATION COEFFICIENT |
| --- | --- |
| Nylon 11 | 0.83 |
| Modified Nylon 6 | 3.29 |
| TPE | 107 |
| High Density Polyethylene | 27.0 |
| MPR | 286 |

It should be understood that any conventional method may be employed when making the inventive high pressure vessel liner using either the modified nylon 6 or nylon 11 material except for rotational molding for the modified nylon 6. Preferably, the method of liner formation is blow molding. That is, the thermoplastic liner material is extruded under a precise temperature and pressure into a hollow parision. The parision is then allowed to hang vertically between mold halves. When the mold is closed around the preform and the tube ends are pinched off at the top and bottom of the mold, air is injected therein. The injected air pushes the soft plastic against the mold walls forming the part. After final assembly, the liner is filament wound to make the vessel and then post cured to its final state.

In another aspect of the present invention, the high pressure vessel liner is wound with filament in an improved manner to avoid the prior art problem of slippage of filaments in the cylinder-to-dome transition region of these types of pressures vessels. As described above, prior art cylindrical pressure vessels are typically wound with low-angle helicals (+/− windings) whose angle is defined by the arc sine [$R_{pole}/R_{cylinder}$] to react the axial load (stress). The cylindrical pressure vessel are also wound with hoops at approximately 90° to the polar or longitudinal axis to react the radial stress. Typically, the hoop windings terminate at the tangent point of the cylinder which is defined as the intersection of the dome to the cylinder. It is structurally critical that the hoop winds are positioned as near as possible to the tangent point to preclude failure. However, when the hoops are arranged at approximately 90° to the longitudinal axis, slippage occurs at and near the tangent point which compromises the pressure vessel integrity.

In the inventive method, filaments are wound as high-angle helicals which allow stable winding past a tangent point onto the dome section. In the broadest embodiment, the angle of the high angle helicals is between 60° to 88°. More preferably, angle 70° to 88° and most preferably 80° to 88°.

Figure 3:
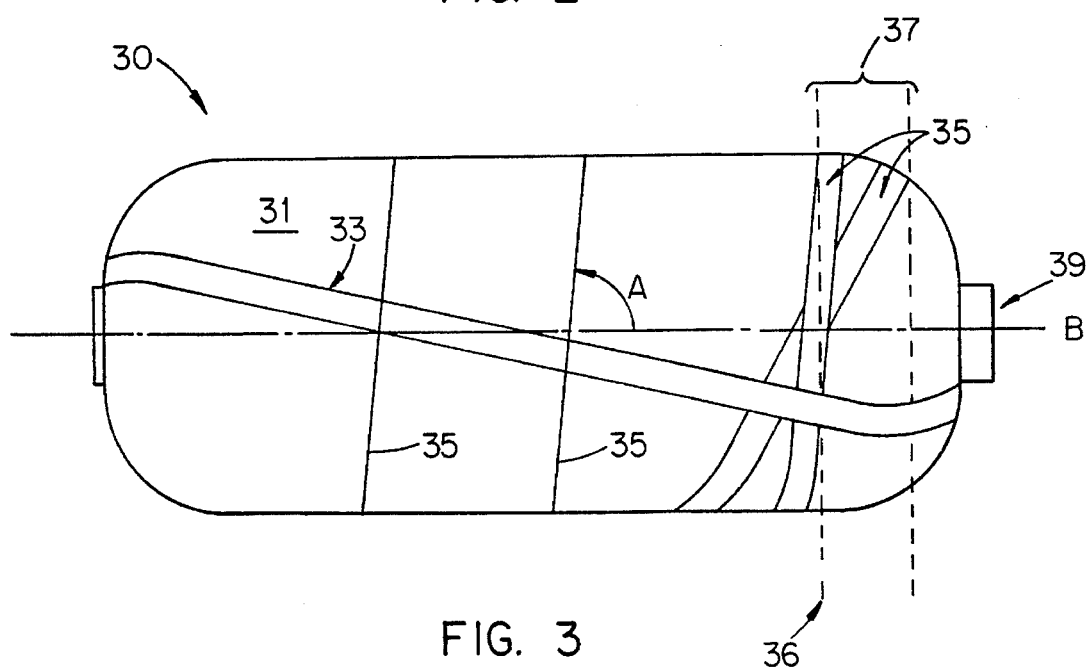
FIG. 3 is a side view of a high pressure vessel depicting the inventive overwrapped filaments in the cylinder-to-dome transition region of a pressure vessel.

With reference now to FIG. 3, a pressure vessel liner 30 made using a modified nylon 6 or nylon 11 is depicted with a longitudinal axis B. On the surface 31 of the liner 30 is shown exemplary low-angle helicals 33. It should be understood that additional helicals are used in construction of the inventive liner which may be wound according to any known method, such as that disclosed in U.S. Pat. No. 3,969,812 to Beck herein incorporated by reference. Therein, low-angle helical windings are disclosed in various layers in combination with the cylindrical (hoop) windings.

Still with reference to FIG. 3, high-angle helicals or hoop windings are designated by the reference numeral 35. These windings 35 (not all being shown) have an angle A with respect to the longitudinal axis B of the liner 30. The angle A, as described above, is at essentially 90° for the standard hoop wind. The new inventive high angle helicals can range from 60° to 88°, preferably 70° to 88° and most preferably 80°–88°. In contrast, standard hoop winds use a 90° angle.

The high angle helical windings 35 are also shown in the cylinder-to-dome transition zone 37 and past the tangent point 36. This is not possible with standard hoop winds without doing other disadvantageous processes as described earlier. By having these windings at a high angle with respect to the longitudinal axis, the high angle helical windings 35 may be wound through the cylinder-to-dome transition region.

Although not shown, the filaments 35 may be continuously wound along the length of the liner 30 at the depicted angle A. In this embodiment, the winding angle would gradually change from layer to layer such that the filaments 35 maintain the correct angulation when passing over the tangent point of the cylinder in the cylinder-to-dome transition region.

By using the angled filaments 35 in the cylinder-to-dome transition, a gradual transition or tapering of the windings in the vicinity of the tangent point is achieved from layer to layer during the wind rather than an abrupt step typical with hoop windings (essentially 90°) which typically terminate just prior to the tangent point. This gradual transition or tapering is particularly important for thick-wall pressure vessels since it significantly reduces the stress riser associated with an abrupt change in section modulus.

The ability of the high angle helical windings 35 to react the radial pressure (stress) is theoretically diminished by the $SIN^2$ of the winding angle. Lower angle helical fibers rapidly lose their efficiency to react the radial stress due to the nature of this function. To compensate for lower angels, more layers would be required increasing the weight and cost of the structure. Consequently, progressively higher angles provide both increased efficiency, lower cost and lower weight while still reinforcing the transition areas. High angle helicals ranging from 70°–88° and 80°–88° offer even further improvements in this regard. Therefore, for the high range of angles given, the ability to react the radial pressure is not greatly affected (for this reason, higher angles are preferred). The high angle helical filaments 35 better distribute the load and reduce or eliminate the tendency for the filaments to unwrap or fail in the cylinder and the cylinder-to-dome transition region.

In addition, winding with the high angle helical filaments 35 permits a hands-off winding in the tangent point area of the liner with no slippage and also eliminates the need to dwell (360°) at the turn-around (plus to minus winding angle transition). The inventive winding process also is straight forward and lends itself to cost-effective high-rate reproduction.

The method of overwrapping the pressure vessel liner 30 can use any known type and size of filaments to achieve the reinforcing effect. Moreover, it should be understood that the inventive pressure vessel liner with or without the filament overwrapping can be used in combination with any known filament winding pattern or other liner components such as a polyurethane protective coating or as an inner liner structure for a metallic, a non-metallic or metallic non-metallic combination liner or vessel.

The dimensions of the pressure vessel liner can also be vary depending on the intended end use. The pressure vessel liner using nylon 11 or modified nylon 6 is especially adapted as a thin wall bladder (0.1 inches) for a compressed natural gas fuel tank for vehicle use. The combination of low permeability, increased volume for a given wall thickness of liner material and the ability to maintain ductility and elongation during the temperature extremes that the tanks are subjected to make it an ideal candidate for these types of applications. These characteristics are also beneficial given projected service environments and specifications promulgated by various organizations to ensure safe and uniform tank design. A typical design specification for the pressure vessel liner material with the high angle helical windings in a CNG fuel tank pressure vessel is designated by the AGA as in NGV-2.

Standard off-the-shelf filament winding machines are suitable for use in winding both the polar or low angle helical windings and the high angle helical windings having the 60° to 88° angulation with the liner longitudinal axis. In a preferred embodiment, the first series of high-angle windings are effected at low liner inflation pressures (about 10 psi). After the first overwrap is done, the liner pressures should be increased to accommodate additional helical and/or hoop windings.

As such, an invention has been disclosed in terms of preferred embodiments thereof which fulfill each and every one of the objects of the present invention as set forth hereinabove and provide new and improved pressurized gas vessel construction and a method of making the vessel.

Various changes, modifications and alterations from the teachings of the present invention may be contemplated by those skilled in the art without departing from the intended spirit and scope thereof. Accordingly, it is intended that the present invention only be limited by the terms of the appended claims.

We claim:

1. In a high pressure vessel liner made of a thermoplastic material, said high pressure vessel liner forming a chamber with at least one opening therein for storing highly pressurized gas, the improvement comprising said thermoplastic material being a material selected from the group consisting of a modified nylon 6 and nylon 11, said high pressure vessel liner exhibiting low permeability to pressurized hydrocarbon gases and acceptable ductility over a temperature range of about −40° F. to 140° F.

2. The high pressure vessel liner of claim 1 wherein said thermoplastic material is modified nylon 6.

3. The high pressure vessel liner of claim 1 wherein said thermoplastic material is nylon 11.

4. The high pressure vessel liner of claim 1 wherein said thermoplastic material exhibits a permeation coefficient of no greater than 6 cc mil/atm day 100 in$^2$ to methane.

5. The high pressure vessel liner of claim 1 wherein said thermoplastic material exhibits an ultimate strain at −40° F. of no less than 7.94%.

6. In a high pressure vessel liner for containment of highly pressurized gases wherein said high pressure vessel liner comprises a cylindrical portion and at least one dome portion, said cylindrical portion separated from said dome portion by a cylinder-to-dome transition region and wherein a high,pressure vessel liner is overwrapped with filaments in both a helical orientation to react the axial stress and a high angle helical orientation to react the radial stress, the improvement comprising a portion of said filaments being overwrapped around said high pressure vessel liner at least in said cylinder-to-dome transition region in a high angle helical orientation wherein an angle between each said filament of said portion of overwrapped filaments and a longitudinal axis of said high pressure vessel liner is about between 60° and 88°, such that each said filament of said portion of overwrapped filaments can be wound past the tangent point and is retained in place without slippage in said cylinder-to-dome transition region when overwrapped wherein said pressure vessel liner is made of a thermoplastic material selected from the group consisting of a modified nylon 6 and nylon 11, said high pressure vessel liner exhibiting low permeability to pressurized hydrocarbon gases and acceptable ductility over a temperature range of about −40° F. to 140° F.

7. The high pressure vessel liner of claim 6 wherein said thermoplastic material is modified nylon 6.

8. The high pressure vessel liner of claim 6 wherein said thermoplastic material is nylon 11.

* * * * *